United States Patent
Yao et al.

(10) Patent No.: US 10,115,207 B2
(45) Date of Patent: Oct. 30, 2018

(54) STEREOSCOPIC IMAGE PROCESSING METHOD AND APPARATUS THEREOF

(75) Inventors: Chien-Chuan Yao, Hsinchu County (TW); Chih Wei Chen, Hsinchu County (TW); Chung-Yi Chen, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 238 days.

(21) Appl. No.: 13/527,739

(22) Filed: Jun. 20, 2012

(65) Prior Publication Data

US 2012/0320045 A1     Dec. 20, 2012

(30) Foreign Application Priority Data

Jun. 20, 2011 (TW) .............................. 100121439 A

(51) Int. Cl.
*G06T 7/50* (2017.01)

(52) U.S. Cl.
CPC ...... *G06T 7/50* (2017.01); *G06T 2207/20021* (2013.01)

(58) Field of Classification Search
USPC ........................................................ 345/419
See application file for complete search history.

(56) References Cited

U.S. PATENT DOCUMENTS

| | | | |
|---|---|---|---|
| 8,537,200 B2 * | 9/2013 | Zhang et al. | 348/42 |
| 2004/0135780 A1 | 7/2004 | Nims | |
| 2004/0189796 A1 * | 9/2004 | Ho | H04N 13/026 348/51 |
| 2005/0254702 A1 * | 11/2005 | Era | H04N 13/026 382/154 |
| 2009/0073170 A1 * | 3/2009 | Berretty | G06K 9/20 345/427 |
| 2009/0196492 A1 * | 8/2009 | Jung et al. | 382/154 |
| 2010/0046837 A1 | 2/2010 | Boughorbel et al. | |
| 2011/0096832 A1 | 4/2011 | Zhang et al. | |
| 2011/0158504 A1 * | 6/2011 | Turner et al. | 382/154 |
| 2012/0274626 A1 * | 11/2012 | Hsieh | 345/419 |

FOREIGN PATENT DOCUMENTS

| | | |
|---|---|---|
| CN | 101542529 | 9/2009 |
| CN | 101841727 A | 9/2010 |
| CN | 102055991 A | 5/2011 |
| TW | 200825979 | 6/2008 |

OTHER PUBLICATIONS

China Patent Office, Office Action, dated Mar. 5, 2014.
Taiwan Patent Office, "Office Action", dated Oct. 15, 2014.
Taiwan Patent Office, "Office Action", dated Aug. 28, 2014.

* cited by examiner

*Primary Examiner* — Jeffrey A Gaffin
*Assistant Examiner* — Richard M Russell
(74) *Attorney, Agent, or Firm* — WPAT, PC

(57) ABSTRACT

An image processing method includes receiving a two-dimensional (2D) input image; detecting an image of a block in the 2D image to generate depth information for the block; and determining a depth of a sub-block image within the block according to the depth information, accurately estimating block-based depth information according to image characteristics of the block and obtaining a depth of a given block/pixel according to the depth information to generate improved stereoscopic images.

19 Claims, 8 Drawing Sheets

STEREOSCOPIC IMAGE PROCESSING METHOD AND APPARATUS THEREOF

CROSS REFERENCE TO RELATED PATENT APPLICATION

This patent application is based on Taiwan, R.O.C. patent application No. 100121439 filed on Jun. 20, 2011.

FIELD OF THE INVENTION

The present invention relates to an image processing mechanism, and more particularly, to an image processing apparatus and method thereof capable of determining a corresponding depth of a two-dimensional (2D) image in a small range according to depth information estimated via a 2D image in a large range.

BACKGROUND OF THE INVENTION

In the conventional 2D to three-dimensional (3D) stereoscopic image conversion technology, a depth of each pixel of a 2D image is estimated and calculated one by one, i.e., in the prior art, different independent estimation and calculation procedures are performed on different pixels, resulting in high calculation resources (e.g., time and circuit areas) in order to accurately estimate the depth of each pixel, and the entire circuit system becomes relatively complicated and costly. Accordingly, for current image processing applications, complicated circuit systems, using many calculation resources, is rather lacking in flexibility. In addition, the conventional technology fails to accurately estimate depth information of image content corresponding to a 2D image, and the conventional 2D image to 3D stereoscopic image conversion technology also creates serious distortion when the 2D image is converted to a 3D stereoscopic image. These are some of the problems faced in the prior art in this field which the current invention serves to address.

SUMMARY OF THE INVENTION

One object of the present invention is to provide an image processing apparatus and method thereof capable of accurately estimating block-based depth information according to image characteristics of a block and obtaining a depth of a pixel according to the depth information to generate a stereoscopic image so as to solve the foregoing problems.

According to an embodiment of the present invention, an image processing method comprises receiving a 2D input image; and detecting an image of a block in the 2D input image to generate depth information for the block, wherein the depth information indicates a depth of the image of the block when the image is stereoscopically displayed.

According to an embodiment of the present invention, an image processing apparatus comprises a detecting circuit, for receiving a 2D input image and detecting an image of a block in the 2D input image to generate depth information for the block; and a determining circuit, coupled to the detecting circuit, for determining a depth of a sub-block image within the block according to the depth information.

According to an embodiment of the present invention, a detecting circuit applied to image processing receives a 2D input image, and detects an image of a block in the 2D input image to generate depth information for the block, wherein the depth information indicates a depth of the image of the block when the image is stereoscopically displayed.

DETAILED DESCRIPTION OF THE PREFERRED EMBODIMENT

Figure 1:
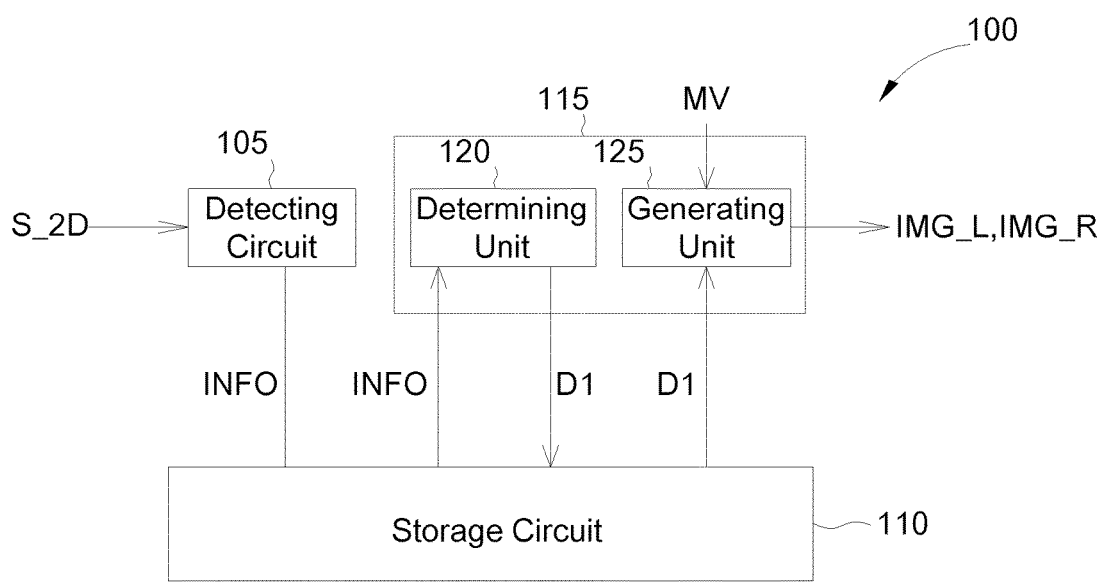
FIG. 1 is a schematic diagram of an image processing apparatus in accordance with an embodiment of the present invention.

FIG. 1 is a schematic diagram of an image processing apparatus 100 in accordance with an embodiment of the present invention. The image processing apparatus 100 comprises a detecting circuit 105, a storage circuit 110, and a processing circuit 115. The processing circuit 115 comprises a determining unit 120 and a generating unit 125. The detecting circuit 105 receives a 2D input image S_2D and detects an image of a block MB in a 2D image S_2D to generate depth information INFO of the block MB. The 2D input image S_2D is a plane image not carrying 3D stereoscopic depth information, and the block MB is an image region having M×N pixels in the 2D input image S_2D, where M and N are positive integer numbers; M may or may not be equal to N, for this example, M and N are 16. The depth information INFO comprises parameters for indicating a depth of the block MB. In this embodiment, the parameters contain a luminance contrast, a color, a spatial position, edge image information, motion information of the image in the block MB, and the like. The parameters of the depth information INFO are outputted by the detecting circuit 105, and are temporarily stored in the storage circuit 110, which may be realized by a digital storage medium, such as dynamic random access memory (DRAM) or a buffer. The processing circuit 115 reads the parameters contained in the depth information INFO from the storage circuit 110, determines a depth of each sub-block image in the block MB, and generates a stereoscopic image according to the generated depths. In this embodiment, a sub-block image, e.g., the image of a single pixel, has a depth equal to that of the image of the single pixel being stereoscopically displayed. In other words, the processing circuit 115 determines the depth of each single pixel according to the depth information INFO of the block MB. In this embodiment, operations for determining the depth of each pixel in the block MB are described below. Since preliminary depths D1 of pixels in the block MB are determined via the determining unit 120 of the processing circuit 115 according to the parameters contained in the depth information INFO of the block MB, they have identical values, so that the preliminary depth D1 is regarded as a block-based depth of all pixels in the block MB. When the determining unit 120 generates the preliminary depth D1 of the pixels in the block MB, the preliminary depth D1 is outputted to and is temporarily stored in the storage circuit 110. Before a stereoscopic image is generated, the subsequent generating unit 125 first reads from the storage unit 110 the preliminary depth D1 and image characteristics of each pixel to generate a target depth D1' (not shown in FIG. 1) of the pixel in the block MB. Since the target depth D1' is qualified to represent a depth degree of the pixel of the stereoscopic image, the generating unit 125 generates the stereoscopic image displayed on the pixel with reference to the target depth D1'. In addition, the generating unit 125 generates the stereoscopic image on the pixel (e.g., a left-eye image or a right-eye image) according to an input reference motion vector MV (i.e., motion information generated via motion estimation).

Operations of the detecting circuit 105, the determining unit 120, and the generating unit 125 are described below. The depth information INFO detected and generated by the detecting circuit 105 contains parameters, such as a luminance contrast, a color, a spatial position, edge image information, motion information of the image in the block MB, and the like. Taking the luminance contrast of the image as an example, the detecting circuit 105 detects a maximum gray-scale value and a minimum gray-scale value of the image in the block MB, calculates a difference between the maximum gray-scale value and the minimum gray-scale value, determines the luminance contrast of the image according to the difference, and stores the determined luminance contrast of the image into the storage circuit 110. The difference represents a degree of the luminance contrast of the image. For example, when the difference is equal to a first difference value, the detecting circuit 105 determines the luminance contrast of the image in the block MB as a first reference value, and also determines that the depth information for the block MB indicates a first depth; when the difference is a second difference that is larger than the first difference value (i.e., the luminance contrast is relatively higher), the detecting circuit 105 determines the luminance contrast of the image in the block MB as a second reference value that is larger than the first reference value, and determines that the depth information for the block MB indicates a second depth that is smaller than the first depth. In other words, the detecting circuit 105 adjusts the depth indicated by the depth information INFO by determining the luminance contrast degree of the image in the block MB. When the luminance contrast gets larger, the detecting circuit 105 determines that the image in the block MB becomes closer to human eyes, i.e., the depth is smaller, and therefore the parameters contained in the depth information INFO are adjusted accordingly to indicate an appropriate depth.

Taking the color of the image as an example, the detecting circuit 105 generates the depth information INFO with reference to the color of the image in the block MB so as to detect whether the image in the block MB shows identifiable portions, for example, a part of the sky. For example, since the color of the sky is approximate to blue, when an image of a block is determined as showing a part of the sky, the block is farther from human eyes when it is stereoscopically displayed, i.e., the block has a greater or greatest relative depth. In practice, since the color of the sky contains a predetermined color range that is approximate to blue, in the event that the color of the image in the block MB is within or corresponds to the predetermined color range, meaning that the image in the block MB shows a part of the sky, the detecting circuit 105 determines that the depth information INFO indicates the first depth (i.e., representing the great or greatest depth). When the color of the image in the block MB is not within or does not correspond to the predetermined color range, meaning that the image in the block MB does not show any part of the sky, the detecting circuit 105 determines that the depth information indicates the second depth that is smaller than the first depth. The color of the image is an average color of images in one block or a color of majority images. In addition, the color of the sky may also not be blue, and is gray or other colors, so that the color range of the sky contains a predetermined color range approximate to gray or a certain predetermined color, i.e., the predetermined color range is not limited to being approximate to a certain predetermined color, and may also be composed of a plurality of color ranges. In addition, the color of the sky shall not be construed as limiting the present invention, and colors of other images at a remote distance which may also be detected according to the present invention are likewise within scope. Therefore, the foregoing embodiments are described for illustration purposes, and shall not be construed as limitations of the present invention.

Taking the spatial position of the image as an example, the detecting circuit 105 detects a spatial position of the image in the block MB, and generates the depth information INFO according to the detected spatial position of the image in the block MB. The spatial position of the image in the block MB is detected by determining a position of the block MB within the 2D image. When the image in the block MB is at an upper position of the 2D image, the block MB has a greater depth; otherwise, the block has a smaller depth. For example, an image of an office floor (at a higher spatial position) is farther from observing human eyes, and an image of an office desk (at a lower spatial position) is closer to observing human eyes. In practice, when the image in the block MB is at a first spatial position of the 2D input image S_2D, the detecting circuit 105 determines that the depth information INFO indicates a first depth; when the image in the block MB is at a second spatial position that is higher than the first spatial position of the 2D input image S_2D, the detecting circuit 105 determines that the depth information INFO indicates a second depth that is greater than the first depth.

Taking an edge image as an example, the detecting circuit 105 generates the depth information INFO according to edge image information of the image in the block MB. In this embodiment, when it is detected that the block MB comprises numerous edge images, the detecting circuit 105 determines that the image in the block MB has a small depth. Therefore, in practice, when the detected edge image information indicates that the block MB has a first number of edge images, the detecting circuit 105 determines that the block MB has the first depth. When the detected edge image information indicates that the block MB has a second number of edge images and the second number is larger than the first number, the detecting circuit 105 determines that block MB has a second depth that is smaller than the first depth.

Taking motion information as an example, the detecting circuit 105 generates the depth information INFO according to motion information of the image in the block MB. In this embodiment, when the estimated motion information indicates a large motion vector, meaning a detectable image is deemed to be moving quickly, typically in a scene close to human eyes. Therefore, the detecting circuit 105 determines that the image has a small depth. In practice, when the motion information indicates a first motion vector, the detecting circuit 105 determines that the depth information INFO of the block MB indicates a first depth; when the motion information indicates a second motion vector that is larger than the first motion vector, the detecting circuit 105 determines that the depth information INFO of the block MB indicates a second depth that is smaller than the first depth.

It is to be noted that, in order to accurately generate a depth of each pixel in subsequent operations, the depth information INFO generated by the detecting circuit 105 comprises the foregoing types of parameters for indicating depths. However, when circuit calculation cost reduction is taken into consideration, the depth information INFO may comprise a few types of parameters but not all parameters, or may only comprise one type of parameters. In addition, the detecting circuit 105 can also generate the depth information INFO according to luminance contrasts, colors, spatial positions and edge image information, and motion information of images within a plurality of adjacent blocks in the block MB, and modifications thereof shall be within the spirit and scope of the present invention.

When the detecting circuit 105 generates and stores the parameters of the depth information INFO into the storage circuit 110, the determining unit 120 reads from the storage circuit 110 the stored parameters, and determines a preliminary depth D1 (i.e., a block-based depth) of the block MB according to the parameters of the depth information INFO. The preliminary depth D1 is regarded as preliminary depths of all pixels in the block MB. When the preliminary depth D1 of each pixel in the block MB is determined, the determining unit 120 temporarily stores the preliminary depth D1 into the storage circuit 110, and reads from the storage circuit 110 via the generating unit 125. In another embodiment, the detecting circuit 105 and the determining unit 120 comprise independent storage circuits, the depth information INFO is outputted from the detecting circuit 105 and is transmitted to the determining unit 120, and the preliminary depth D1 is outputted from the determining unit 120 and is transmitted to the generating unit 125, wherein both the depth information INFO and the preliminary depth D1 are transmitted via the storage circuit 110 during the transmission process. Therefore, the generating unit 125 determines a target depth D1' of a pixel according to the preliminary depth D1 and a 2D image of the pixel. In practice, the generating unit 125 fine-tunes the preliminary depth D1 according to a gray-scale value of the 2D image of the pixel to generate the target depth D1' in association with image content of the pixel. When the gray-scale value of the pixel is large (i.e., the luminance value is large), the generating unit 125 reduces the preliminary depth D1 of the pixel according to the large gray-scale value to generate the target depth D1'. When the gray-scale value of the pixel is small (i.e., the luminance value is small), the generating unit 125 increases the preliminary depth D1 of the pixel according to the small gray-scale value to generate the target depth D1'.

Therefore, although human eyes cannot obtain a stereoscopic visual lay-perception of the image in the block MB since the preliminary depths D1 of all pixels are identical to each other, the generating unit 125 fine-tunes the preliminary depth D1 of each pixel according to the gray-scale value of each pixel to generate a target depth of each pixel, so as to achieve a depth compensation effect of different pixels according to different pixel gray-scale values. For example, supposing that the image displayed in the block MB shows a leaf of a tree, when the foregoing preliminary depth D1 is regarded as the target depth of each pixel, the target depths D1' of leaves are the same, human eyes cannot obtain a stereoscopic depth perception between leaves from a subsequently-generated stereoscopic image. However, when the target depth D1' of each pixel is generated by fine-tuning/compensating the preliminary depth D1 of each pixel, the target depths of leaves are different from each other, and thus human eyes can easily obtain the stereoscopic depth perception from the subsequently-generated stereoscopic image.

It is to be noted that, a preferred stereoscopic depth perception is obtained by fine-tuning the preliminary depth D1 to generate the target depth D1', and it shall not be construed as limiting the present invention. In other embodiments, the generating unit 125 directly adopts the preliminary depth D1 of the block MB as the target depth D1' of each pixel in the block MB to meet a basic requirement of stereoscopic image display as well as reducing the circuit calculation cost. For example, supposing that the image displayed in the block MB is a part of the sky, the generating unit 125 determines that the image in the block MB shows the farthest scene according to the temporarily stored preliminary depth D1. Since human eyes are not sensitive to depth variations of the image showing the farthest scene, the generating unit 125 directly defines the preliminary depth D1 of the block MB as the target depth D1' of each pixel in the block MB but not adopt the foregoing step of fine-tuning the preliminary depth D1. Accordingly, the basic requirement of stereoscopic image display (while human eyes cannot perceive the depth variations of the image showing the farthest scene) is met and the software/hardware calculation cost is also reduced.

Figure 2:
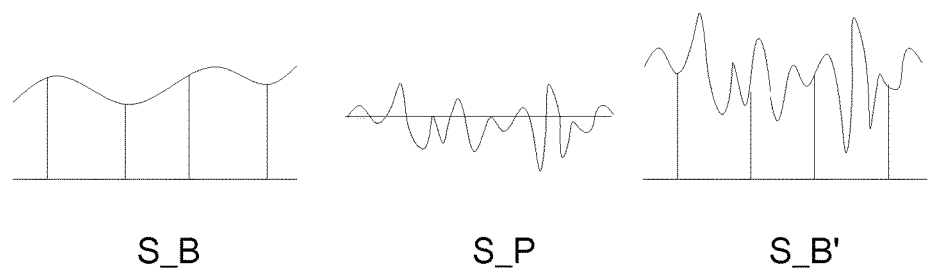
FIG. 2 is a schematic diagram of depth variations of a preliminary depth D1, pixel-based depth variations, and depth variations of a target depth in accordance with an embodiment of the present invention.

Accordingly, in this embodiment, the generating unit 125 adaptively determines whether to fine-tune the preliminary depth D1 according to characteristics of the image in the block MB. In addition, since the preliminary depth D1 of the block MB may be selected as a target depth of one pixel, the generating unit 125 is regarded as determining a depth of a pixel in the block MB according to the depth information INFO. Since the determining unit 120 and the generating unit 125 are contained in the processing circuit 115, operations of the determining unit 120 and the generating unit 125 are also considered operations of the processing circuit 115. In order to illustrate a difference between the preliminary depth D1 and the target depth D1', FIG. 2 shows a schematic diagram of depth variations of the preliminary depth D1 of the image frame, pixel-based depth variations, and depth variations of the target depth D1'. Referring to FIG. 2, a curve S_B representing variations of the preliminary depth D1 of a plurality of blocks changes slowly and smoothly, meaning that the preliminary depths D1 of all pixels in the plurality of blocks of an image frame are identical to each other. A curve S_P representing pixel-based depth variations changes more dramatically and randomly than the curve S_B, meaning that the pixel-based depth variations of all pixels in the plurality of blocks of the image frame are different, so that the pixel-based depth variations are represented by the curve S_P. A curve S_B' generated by modifying the curve S_B via the curve S_P represents variations of the target depth D1'. Therefore, the operations of generating the preliminary depth D1 and generating the target depth D1' by fine-tuning the preliminary depth D1 are capable of effectively and accurately generating a stereoscopic depth corresponding to an image of each pixel of an image frame.

Figure 3A:
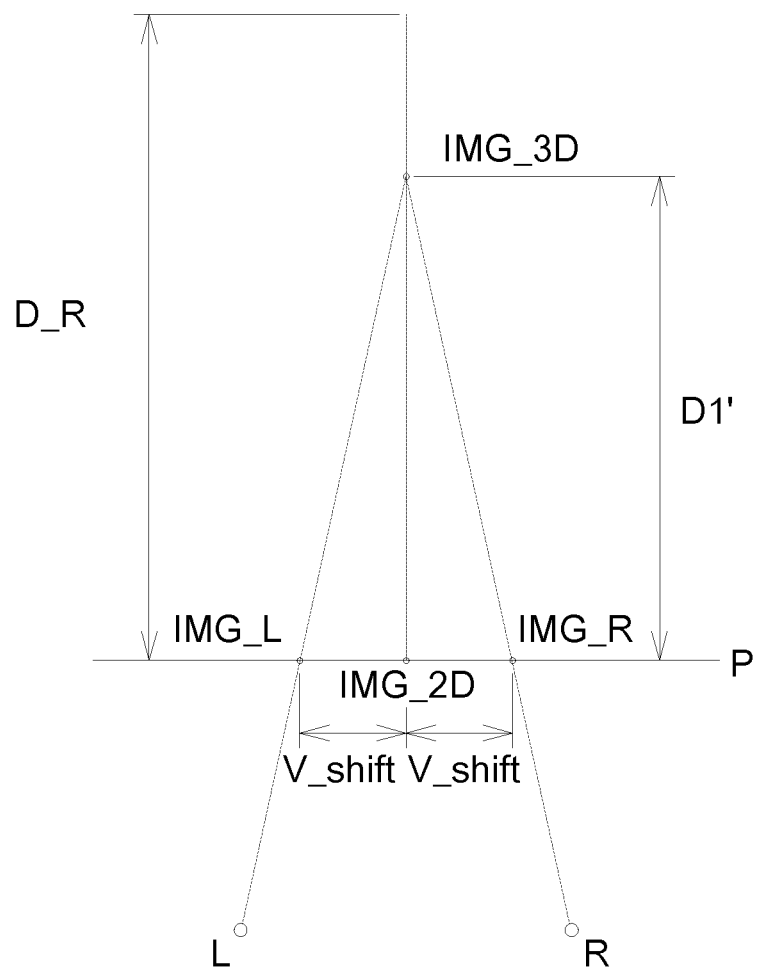
FIG. 3a is a schematic diagram of a target depth D1', a variation range D_R of the target depth D1', a horizontal shift V_shift, a 2D image IMG_2D and a 3D image IMG_3D perceived by human eyes in accordance with an embodiment of the present invention.

In addition, when the target depth D1' of a pixel in the block MB is generated, the generating unit 125 determines a horizontal shift V_shift between a first visual-angle image (e.g., a left-eye image) corresponding to the image (e.g., a sub-block image) of the pixel and a second visual-angle image (e.g., a right-eye image) according to the generated target depth D1', and generates the first visual-angle image and the second visual-angle image according to the determined horizontal shift V_shift. FIG. 3a shows a schematic diagram of a target depth D1', a horizontal shift V_shift, a 2D image IMG_2D, and a 3D image IMG_3D perceived by human eyes in accordance with an embodiment of the present invention. A left eye L represents a left eye of a person, a right eye R represents a right eye of the person, a horizontal line P represents a display panel, and an image IMG_2D represents a 2D plane image displayed on a pixel. When the target depth D1' is generated, the generating unit 125 respectively generates a left-eye image IMG_L and a right-eye image IMG_R at a horizontal shift V_shift from the left side and the right side of the 2D image according to principles of stereoscopic imaging and the target depth D1' (D_R represents a variation range from a smallest depth to a greatest depth of the target depth. Accordingly, the left eye L observes the left-eye image IMG_L at an accurate position point of the frame and the right eye R observes the right-eye image IMG_R at another accurate position point of the frame, so that the human eyes perceive imaging of the stereoscopic image IMG_3D. It is to be noted that, the generating unit 125 generates another horizontal shift V_shift' corresponding to the image (i.e., a sub-block image) of the pixel according to the generated target depth D1', and generates multi-visual-angle images according to the horizontal shift V_shift. In other words, the generating unit 125 generates multi-visual-angle images according to a target depth of an image of a single pixel.

Figure 3B:
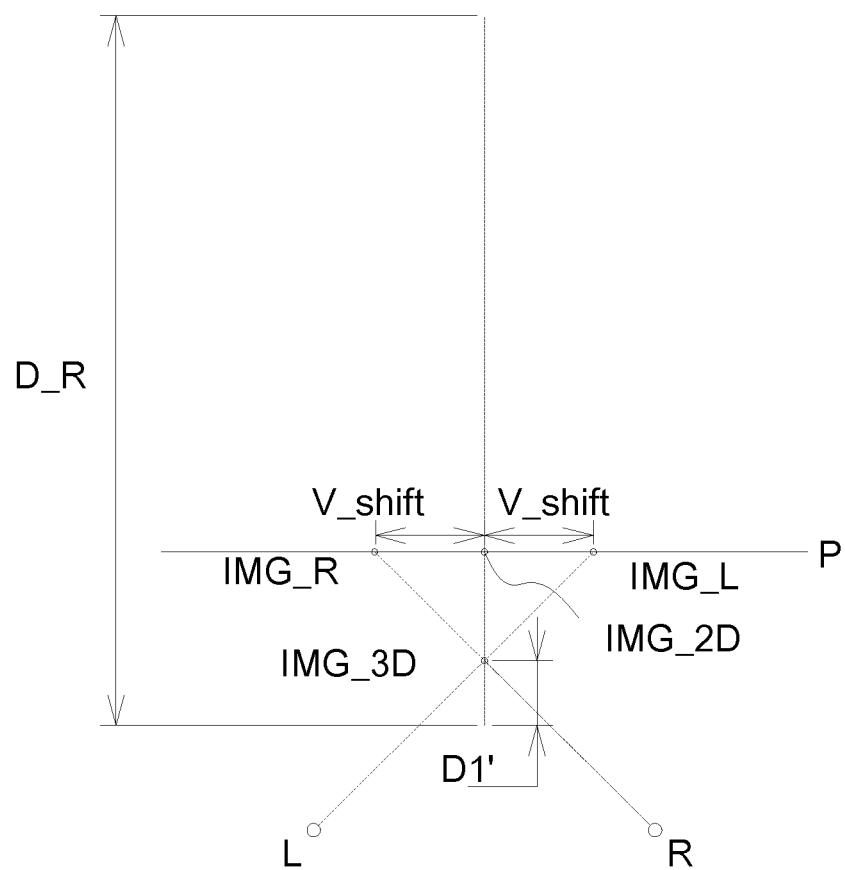
FIG. 3b is a schematic diagram of a target depth D1', a variation range D_R of the target depth D1', a horizontal shift V_shift, a 2D image IMG_2D and a 3D image IMG_3D perceived by human eyes in accordance with an embodiment of the present invention.

In addition, the generating unit 125 determines the horizontal shift V_shift according to the generated target depth D1', a foreground/background adjustment value to provide diversified design variations of imaging of the stereoscopic image. Refer to FIG. 3b showing a schematic diagram of the target depth D1', the variation range D_R of the target depth D1', the horizontal shift V_shift, the 2D image IMG_2D, and the 3D image IMG_3D perceived by human eyes in accordance with an embodiment of the present invention. A left eye L represents a left eye of a person, a right eye R represents a right eye of the person, a horizontal line P represents a display panel, and an image IMG_2D represents a 2D panel image displayed on a pixel. When the target depth D1' is generated, the generating unit 125 defines a variation range D_R from a smallest depth to a greatest depth of the target depth according to the foreground/background adjustment value. Referring to FIG. 3b, the range D_R indicates that the stereoscopic image perceived by human eyes is designed as being at the foreground of the display panel. The generating unit 125 generates a left-eye image IMG_L at a horizontal shift V_shift from the right side of the 2D image IMG_2D, and generates a right-eye image at the horizontal shift V_shift from the left side of the 2D image IMG_2D according to the principles of stereoscopic imaging, the target depth D1' and the variation range D_R of the target depth D1' defined via the foreground/background adjustment value, so that the left eye L observes the left-eye image IMG_L at an accurate position point of a frame and the right eye R observes the right eye image IMG_R at another accurate position point, and thus human eyes perceive that the stereoscopic image IMG_3D is imaged at the foreground of the display panel P. In addition, the generating unit 125 generates the foregoing horizontal shift V_shift according to the target depth D1' and a gain value, which is for reducing or increasing the horizontal shift V_shift, so that generation of the horizontal shift V_shift gets more flexibility. In addition, when a horizontal shift V_shift corresponding to each pixel is generated, the horizontal shift V_shift is designed as being smaller than 1, so as to avoid sequence disorder of the left-eye and right-eye images corresponding to the current pixel and left-eye and right-eye images corresponding to an adjacent pixel. Therefore, disadvantages that are created by the application of the 2D image for generating the stereoscopic image are avoided.

Figure 4A:
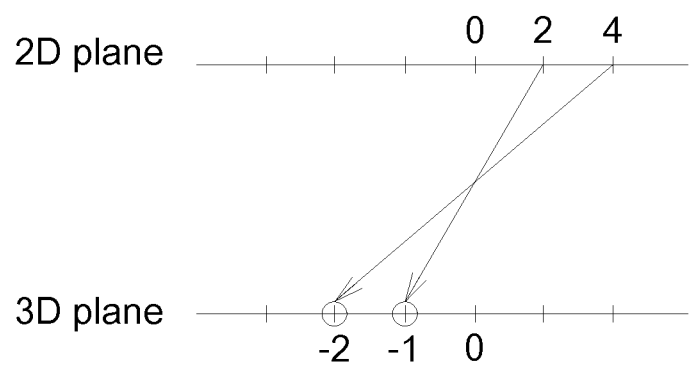
FIG. 4a is a schematic diagram of image sequence distortion created by a horizontal shift V_shift being larger than 1 when a preliminary depth D1 is adopted to perform depth calculation.

In order to understand the sequence disorder of the images, refer to FIG. 4a showing a schematic diagram of image sequence disorder created by the horizontal shift V_shift being larger than 1 when the preliminary depth D1 is adopted to perform depth calculation. At this point, the preliminary depth D1 is applied to a plurality of pixel points within a block range. In order to smooth depths of the plurality of pixel points, a depth linear interpolation is performed on a plurality of pixel points within two blocks to provide smooth depth variations to the pixel points. Referring to FIG. 4a, pixel points 0 to 64 on a 2D image plane are projected at 32 pixel points on a 3D image plane, and the horizontal shift V_shift is 2. In such situations, the pixel point 2 on the 2D image plane is projected at the position-1 on the 3D image plane, and the pixel point 4 is projected at the position-2 on the 3D image plane, thus creating left and right sequence disorder. Obviously, such a sequence disorder generates an error (the image of the 3D image plane is a mirror image of the image of the 2D image plane), such that the displayed result is not the desired output. In order to solve such a problem, the pixel points 0 to 64 on the 2D image plane need to be arranged within the 32 pixel points on the 3D image plane, i.e., a horizontal shift between every two pixel points on the 2D image plane needs to be 0.5 so as to linearly interpolate the numbers of the 2D image plane into the 3D image plane while sequence disorder is avoided. It is to be noted that, the operation of designing the horizontal shift V_shift as being smaller than 1 is explained from example, and it shall not construed as a specific limitation of the present invention. In other embodiments, the horizontal shift V_shift may also be designed as being smaller than a predetermined value (e.g., the predetermined value of 1), so as to overcome the disadvantages created by the application of the 2D image for generating the stereoscopic image.

When the target depth D1' comprises depth details of each pixel, taking an image having a certain visual-angle (e.g., a right-eye image) as an example, during a process of converting a 2D image to a 3D right-eye image, in the event that a plurality of 3D right-eye images corresponding to each pixel of the 2D image are generated according to the respective corresponding horizontal shift V_shift, the right-eye images may not be necessarily displayed on pixel display points of the display panel. In other words, the conventional approach of converting the 2D image to the 3D stereoscopic image creates the problem that an accurate shift of the current pixel cannot be accurately displayed or even cannot be displayed. In order to solve this problem, in this embodiment, the generating unit 125 by weight generates a horizontal shift corresponding to a target depth of the right-eye image of the current pixel according to two target depths of two right-eye images around the current pixel and two horizontal shifts corresponding to the target depths of the two right-eye images. Likewise, the generating unit 125 by weight generates a horizontal shift corresponding to a target depth of the left-eye image of the current pixel according to two target depths of two left-eye images around the current pixel and two horizontal shifts corresponding to the target depths of the two left-eye images. In other words, according to the depth information INFO, the generating unit 125 first determines a first horizontal shift of a plurality images with different visual angles corresponding to a first sub-block image and a second horizontal shift of a plurality of images with different visual angles corresponding to a second sub-block image, and then generates a horizontal shift (corresponding to the target depth of the image of the current pixel) of a plurality of images with different visual angles within a sub-block image between the first and second sub-block images according to the first horizontal shift of the plurality of images with different visual angles corresponding to the first sub-block image and the second horizontal shift of the plurality of images with different visual angles corresponding to the second sub-block image, so as to generate the target depth of the current pixel via weight calculation approach to effectively overcome the disadvantages of stereoscopic image display.

Figure 4B:
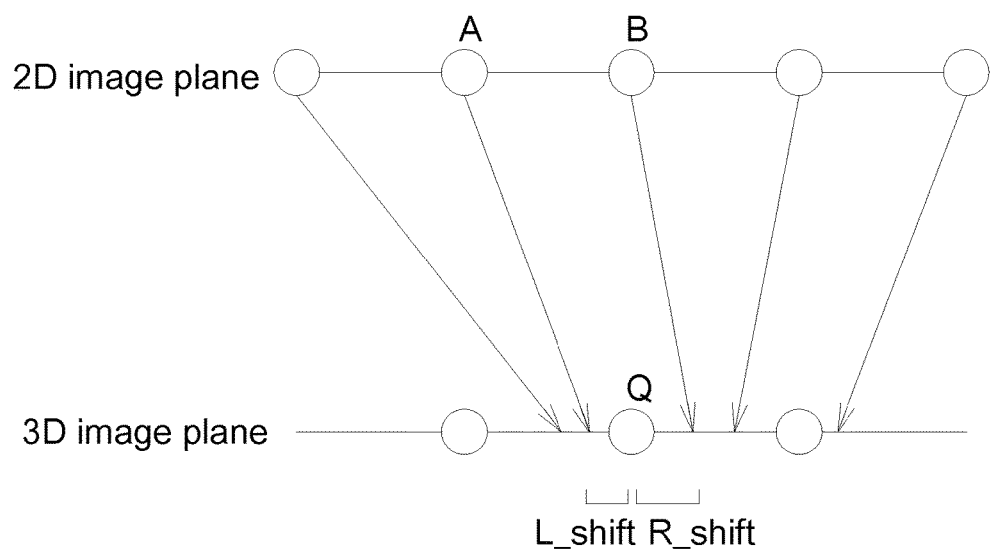
FIG. 4b is a schematic diagram of an image conversion weight method for a generating unit illustrated in FIG. 1.

In order to illustrate the foregoing weight calculation process, refer to FIG. 4b showing a schematic diagram of an image converting weight method in accordance with an embodiment of the present invention. There are a plurality of pixel display points (comprising but not limited to point A and point B) on an original 2D image plane, the pixel display points carry different horizontal shifts after having been converted and are rearranged on a 3D image plane illustrated in FIG. 4b. As mentioned above, the problem is that the pixel display point may not be redisplayed on the 3D image plane since the horizontal shifts of the pixel display points may not be integers. In order to solve this problem, a pixel display point Q on the 3D image plane is first defined as a center point, and a search range of pixel display points on the 2D image plane is defined as being within a certain integer value range before and after the point Q. After that, points on the 3D image plane that are generated from converting the pixel points on the 2D image plane are one by one checked within the search range to select two converted points closest to both sides of the point Q on the 3D image plane, so as to perform weight calculation according to horizontal shifts of the pixel point A and the pixel point B on the 2D image plane corresponding to the two converted points. In this embodiment, linear interpolation is performed on the horizontal shifts of the point A and the point B to calculate a horizontal shift of the point Q; however, these particulars shall not be construed as a specific limitation of the present invention. The horizontal shift of the point A on the 3D image plane is represented by L_shift, and the horizontal shift of the point B on the 3D image plane is represented by R_shift. A mathematic relationship is represented by:

$$Q = \frac{L\_shift}{L\_shift + R\_shift} B + \frac{R\_shift}{L\_shift + R\_shift} A$$

Figure 4C:
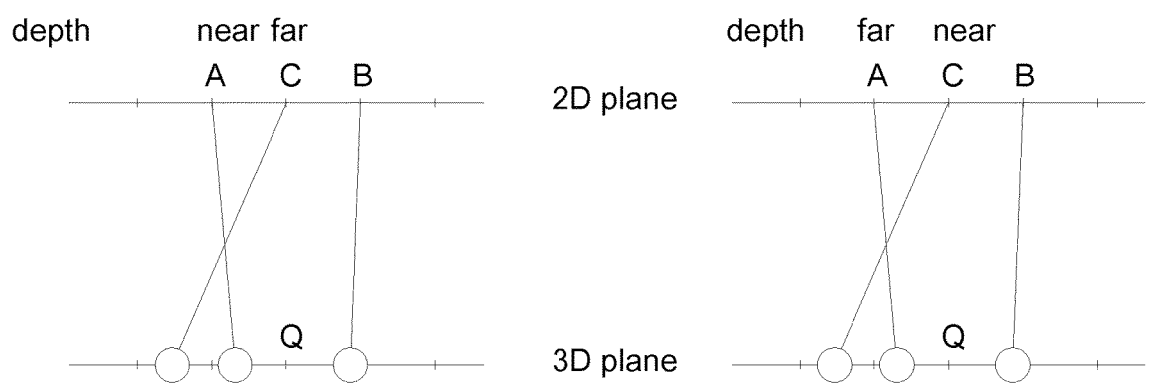
FIG. 4c is a schematic diagram of operations for selecting a weight average point via the image conversion weight method illustrated in FIG. 4b.

More specifically, when the weight calculation is performed to generate the horizontal shift of the current pixel, the foregoing image sequence disorder problem needs to be taken into consideration. In order to solve this type of problems, when the target depth D1' is adopted to perform calculation, e.g., when the horizontal shifts of the points A and B on both sides of and closest to the point Q are selected for weight calculation, points closest to a user (i.e., points having the smallest depths) are selected for weight calculation to display a phenomena that a pixel point having a greater depth is shielded by a pixel point having a smaller depth on the 3D image plane that is further horizontally shifted. Referring to the right side of FIG. 4c, compared to the point A, a projected point of a point C on the 3D image plane is farther from the point Q, and the point C has a depth smaller than that of the point A, so that the point C is also selected as a weight average point for calculating the horizontal shift of the point Q even if the projected point of the point A on the 3D image plane is closer to the point Q. In addition, referring to the left side of FIG. 4c, the projected point of the point C on the 3D image plane is farther from the point Q, and the projected point of the point A on the 3D image plane is closer to the point Q. At this point, since the depth of the point A is smaller than that of the point C, the point A is selected as the weight average point for calculating the horizontal shift of the point Q.

Figure 5:
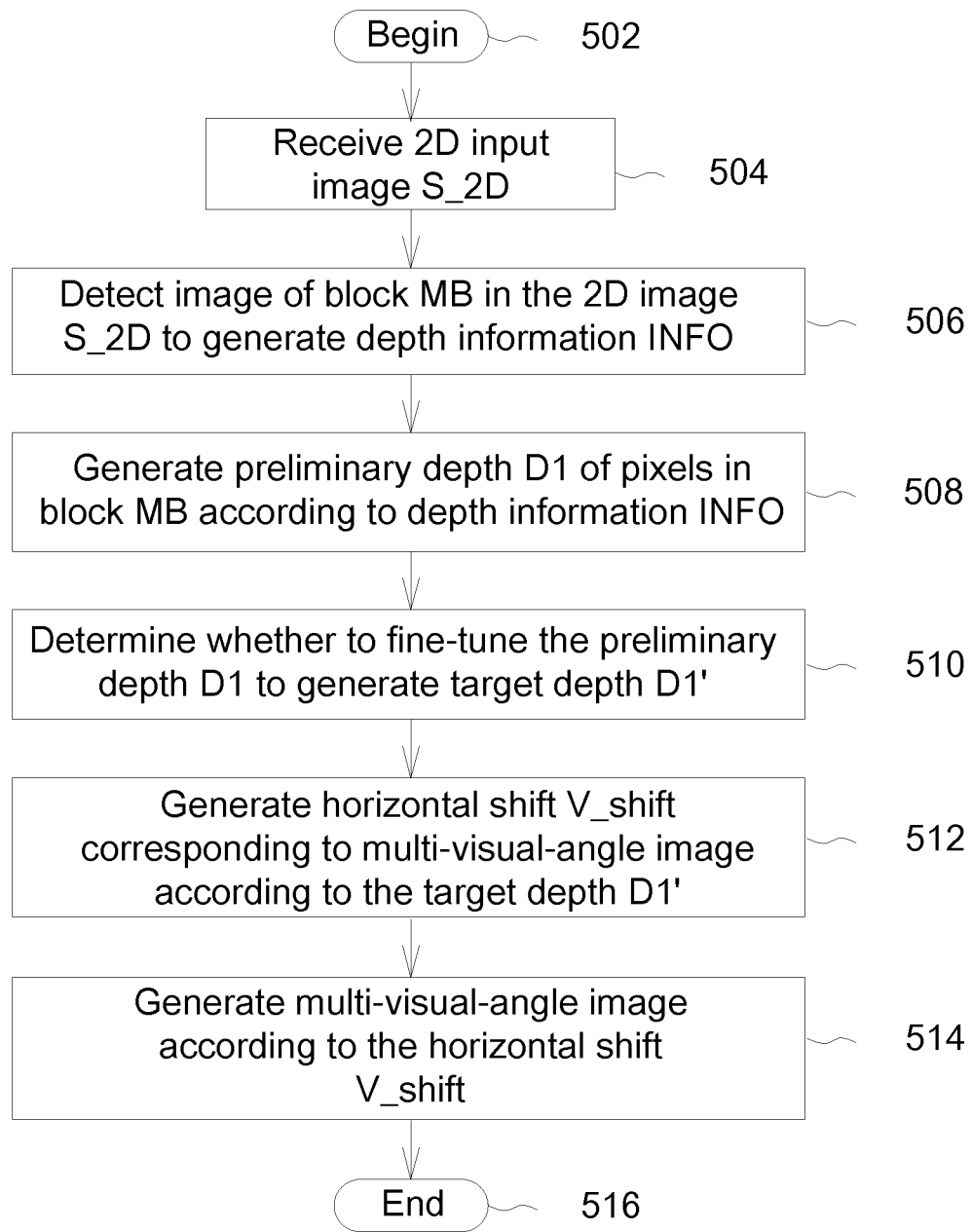
FIG. 5 is a flow chart of operations of an image processing apparatus illustrated in FIG. 1 in accordance with an embodiment of the present invention.

In order to understand the scope and the spirit of the present invention, FIG. 5 shows a flow chart of operations of the image processing apparatus 100 in accordance with an embodiment of the present invention. FIG. 5 need not be performed exclusively according to this original sequence, nor the step of the flow need be consecutively performed, provided that a substantially same result is obtained, i.e., other steps may be added to the flow.

The flow begins with Step 502. In Step 504, the detecting circuit 105 receives a 2D input image S_2D. In Step 506, the detecting circuit 105 detects an image of a block MB in the 2D image S_2D to generate depth information INFO of the block MB, wherein the depth information comprises parameters, such as a luminance contrast, a color, a spatial position, edge image information, motion information of the image, and the like. In Step 508, the determining unit 120 generates a preliminary depth D1 of pixels in the block MB according to the depth information INFO of the block MB. In Step 510, the generating unit 125 refers to the preliminary depth D1 and determines whether to fine-tune the preliminary depth D1 to generate a target depth D1' of each pixel, wherein the preliminary depth D1 is a block-based depth, and the target depths D1' is a pixel-based depth. In Step 512, the generating unit 125 generates a horizontal shift V_shift corresponding to a multi-visual-angle image of the pixel according to the target depth D1'. In Step 514, the generating unit 125 generates the multi-visual-angle image of the pixel according to the horizontal shift V_shift, so that human eyes can perceive imaging of a stereoscopic image when an image frame is observed. The flow ends in Step 516.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image processing method implemented by an image processing apparatus, comprising:
    receiving a two-dimensional (2D) input image comprising a plurality of image region blocks, wherein each image region block comprises at least a first pixel and a second pixel;
    generating a depth information for a block according to an image detection of the block, wherein the depth information comprises a parameter and indicates a block-based depth when the 2D input image is stereoscopically displayed;

determining a first depth of each pixel in the block according to the parameter, wherein the first depth of each pixel in the block is equal to the block-based depth; and generating a second depth of each pixel of said 2D input image by fine-tuning said first depth of each pixel according to image characteristics of the corresponding pixel of the 2D input image;

wherein, the first depth of the first pixel is fine-tuned according to a gray-scaled value of the first pixel to generate the second depth of the first pixel, and the first depth of the second pixel is fine-tuned according to a gray-scaled value of the second pixel to generate the second depth of the second pixel;

wherein, the gray-scaled value of each pixel reflects the luminance of the corresponding pixel of the 2D input image.

2. The image processing method as claimed in claim 1, the depth information being generated according to a difference between a maximum gray-scale value and a minimum gray-scale value, the method comprising:

generating the depth information to indicate a first block-based depth when the difference is a first difference value; and generating the depth information to indicate a second block-based depth when the difference is a second difference value, wherein the second block-based depth is smaller than the first block-based depth, and the second difference values is larger than the first difference value.

3. The image processing method as claimed in claim 1, wherein the step of generating the depth information comprises:

generating the depth information to indicate a first block-based depth when a color of the image of the block corresponds to a predetermined color range; and generating the depth information to indicate a second block-based depth when the color of the image of the block does not correspond to the predetermined color range, wherein the second block-based depth is smaller than the first block-based depth.

4. The image processing method as claimed in claim 1, wherein the step of generating the depth information comprises:

generating the depth information to indicate a first block-based depth when the image of the block is at a first spatial position of the 2D input image; and generating the depth information to indicate a second block-based depth when the image of the block is at a second spatial position, wherein the second block-based depth is greater than first block-based depth, and the second spatial position is higher than the first spatial position.

5. The image processing method as claimed in claim 1, wherein the step of generating the depth information comprises:

generating the depth information to indicate a first block-based depth when edge image information of the image of the block indicates a first number of edge images; and generating the depth information to indicate a second block-based depth when the edge image information indicates a second number of edge images and the second number is larger than the first number, wherein the second block-based depth is smaller than the first block-based depth.

6. The image processing method as claimed in claim 1, wherein the step of generating the depth information comprises:

generating the depth information to indicate a first block-based depth when motion information indicates a first motion vector; and generating the depth information to indicate a second block-based depth when the motion information indicates a second motion vector, wherein the second block-based depth is smaller than the first block-based depth, and the second motion vector is larger than the first motion vector.

7. The image processing method as claimed in claim 1, further comprising:

determining a horizontal shift between a first visual-angle image and a second visual-angle image corresponding to a sub-block image according to the depth information, wherein the horizontal shift is determined according to the depth information and a foreground/background adjustment value; and generating the first visual-angle image and the second visual-angle image according to the determined horizontal shift;

wherein, determining the horizontal shift further comprises determining the horizontal shift according to the depth information and a gain value, with the horizontal shift being smaller than 1 pixel point.

8. The image processing method as claimed in claim 1, further comprising:

determining a first horizontal shift of a plurality of images comprised of a first set of different visual angles corresponding to a first sub-block image according to the depth information;

determining a second horizontal shift of a plurality of images comprised of a second set of different visual angles corresponding to a second sub-block image according to the depth information; and generating a horizontal shift of a plurality of images comprised of a third set of different visual angles in a sub-block image between the first and second sub-block images according to the first horizontal shift of the plurality of images comprised of a first set of different visual angles corresponding to the first sub-block image and the second horizontal shift of the plurality of images comprised of a second set of different visual angles corresponding to the second sub-block image.

9. The image processing method as claimed in claim 1, wherein fine-tuning said block-based depth of each pixel according to image characteristics of each pixel further comprises:

when the gray-scaled value of the first pixel is a large gray-scaled value, reducing the first depth of the first pixel to generate the second depth of the first pixel;

when the gray-scaled value of the first pixel is a small gray-scaled value, increasing the first depth of the first pixel to generate the second depth of the first pixel;

when the gray-scaled value of the second pixel is a large gray-scaled value, reducing the first depth of the second pixel to generate the second depth of the second pixel; and when the gray-scaled value of the second pixel is a small gray-scaled value, increasing the first depth of the second pixel to generate the second depth of the second pixel.

10. The image processing method as claimed in claim 1, further comprising performing a weight calculation method for generating a horizontal shift between a first visual-angle image and a second visual-angle image, the weight calculation method including the steps of:
determining a first pixel display point for the first pixel and a second pixel display point for the second pixel on the 2D input image;
determining a weight-adjusted point on the 3D image plane when the 2D input image is stereoscopically displayed, the central point positioned between a stereoscopic first pixel display point for the first pixel and a stereoscopic second pixel display point for the second point, wherein the weight adjusted point is positioned proportional to the first pixel display point and the second pixel display point and having a horizontal shift based on a weight average point of the lower of the second depth of the first pixel or the second depth of the second pixel;
determining a horizontal shift between the first visual-angle image and the second visual-angle image corresponding to the second depth of the first pixel and the second depth of the second pixel.

11. An image processing apparatus, comprising:
a detecting circuit, for receiving a 2D input image comprising a plurality of image region blocks, generating depth information for each image region block according to an image detection, wherein each image region block comprises at least a first pixel and a second pixel;
a processing circuit, comprising:
a determining unit, for determining a first depth of each pixel in a block according to a parameter comprised in the depth information, wherein the depth information indicates a block-based depth when the 2D input image is stereoscopically displayed, wherein the first depth of each pixel in the block is equal to the block-based depth; and
a generating unit, for generating a second depth of each pixel of the block by fine-tuning said first depth of each pixel according to image characteristics of the corresponding pixel of the 2D input image;
wherein, the first depth of the first pixel is fine-tuned according to a gray-scaled value of the first pixel to generate a second depth of the first pixel, and the first depth of the second pixel is fine-tuned according to a gray-scaled value of the second pixel to generate a second depth of the second pixel;
wherein, the gray-scaled value of each pixel reflects the luminance of the corresponding pixel of the 2D input image.

12. The image processing apparatus as claimed in claim 11, wherein the depth information is generated by a difference between a maximum gray-scale value and a minimum gray-scale value;
wherein the detecting circuit generates the depth information to indicate a first block-based depth when the difference is a first difference value;
wherein the detecting circuit generates the depth information to indicate a second block-based depth when the difference is a second difference value, wherein the second block-based depth is smaller than the first block-based depth, and the second difference value is larger than the first difference value.

13. The image processing apparatus as claimed in claim 11, wherein when a color of the image of the block corresponds to a predetermined color range, the detecting circuit generates the depth information to indicate a first block-based depth; and
the detecting circuit generates the depth information to indicate a second block-based depth when the color does not correspond to the predetermined color range, wherein the second block-based depth is smaller than the first block-based depth.

14. The image processing apparatus as claimed in claim 11, wherein the detecting circuit generates the depth information to indicate a first block-based depth when the image of the block is at a first spatial position of the 2D input image; and
the detecting circuit generates the depth information to indicate a block-based second depth when the image of the block is at a second spatial position, wherein the second block-based depth is greater than the first block-based depth, and the second spatial position is higher than the first spatial position.

15. The image processing apparatus as claimed in claim 11, wherein the detecting circuit generates the depth information to indicate a first block-based depth when the image of the block indicates a first number of edge images; and
the detecting circuit generates the depth information to indicate a second block-based depth when the image of the block indicates a second number of edge images and the second number is larger than the first number, wherein the second block-based depth is smaller than the first block-based depth.

16. The image processing apparatus as claimed in claim 11, wherein the detecting circuit generates the depth information to indicate a first block-based depth when a motion information indicates a first motion vector; and the detecting circuit generates the depth information to indicate a second block-based depth when the motion information indicates a second motion vector, wherein the second block-based depth is smaller than the first block-based depth, and the second motion vector is larger than the first motion vector.

17. The image processing apparatus as claimed in claim 11, wherein the generating unit additionally
determines a horizontal shift between a first visual-angle image and a second visual-angle image corresponding to a sub-block image according to the depth information;
generates the first visual-angle image and the second visual-angle image according to the determined horizontal shift, which is determined via the generating unit according to the depth information and a foreground/background adjustment value; and
determines the horizontal shift according to the depth and a gain value, and the horizontal shift is smaller than 1 pixel point.

18. The image processing apparatus as claimed in claim 11, wherein the processing circuit determines a depth of a sub-block image in the block according to the depth information for the block and a 2D image of the sub-block image.

19. The image processing apparatus as claimed in claim 11, wherein the generating unit further determines a first horizontal shift of a plurality of images with different visual-angles corresponding to a first sub-block image and a second horizontal shift of a plurality of images with different visual-angles corresponding to a second sub-block image, and generates a horizontal shift of a plurality of images with different visual-angles of a sub-block image between the first and second sub-block images.

* * * * *